United States Patent
Ling et al.

(10) Patent No.: US 12,317,262 B2
(45) Date of Patent: May 27, 2025

(54) USER EQUIPMENT, BASE STATION AND METHOD FOR TRANSMITTING UPLINK CONTROL INFORMATION TO MULTIPLE TRANSMISSION RECEPTION POINTS

(71) Applicant: LENOVO (BEIJING) LIMITED, Beijing (CN)

(72) Inventors: Wei Ling, Beijing (CN); Chenxi Zhu, Beijing (CN); Bingchao Liu, Beijing (CN); Lingling Xiao, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 562 days.

(21) Appl. No.: 17/424,832

(22) PCT Filed: Jan. 28, 2019

(86) PCT No.: PCT/CN2019/073462
§ 371 (c)(1),
(2) Date: Jul. 21, 2021

(87) PCT Pub. No.: WO2020/154856
PCT Pub. Date: Aug. 6, 2020

(65) Prior Publication Data
US 2022/0141816 A1 May 5, 2022

(51) Int. Cl.
*H04W 4/00* (2018.01)
*H04L 5/00* (2006.01)
*H04W 72/21* (2023.01)

(52) U.S. Cl.
CPC ........... *H04W 72/21* (2023.01); *H04L 5/0048* (2013.01); *H04L 5/0055* (2013.01)

(58) Field of Classification Search
None
See application file for complete search history.

(56) References Cited

U.S. PATENT DOCUMENTS 9,716,576 B2 *  7/2017  Chun .................... H04L 5/0023
2014/0192757 A1  7/2014  Lee et al.
(Continued)

FOREIGN PATENT DOCUMENTS

CN          102111249 A      6/2011
WO      WO-2017119921 A1 *  7/2017  ........... H04L 5/0039
WO         2018231728 A1    12/2018

OTHER PUBLICATIONS

Ericsson, Multi-TRP and multi-panel transmission, 3GPP TSG-RAN WG1 NR Ad Hoc #3, R1-1716345, Sep. 18-21, 2017, pp. 1-8, Nagoya, Japan.
(Continued)

*Primary Examiner* — Zewdu A Beyen
(74) *Attorney, Agent, or Firm* — Kunzler Bean & Adamson (57) ABSTRACT

The present application relates to a user equipment, a base station and method for transmitting uplink control information to multiple transmission reception points. The base station transmits a configuration to the user equipment. The user equipment is indicated by the configuration that a plurality of uplink control information are associated with a designated index. When the plurality of uplink control information associated with the designated index are ready to be transmitted, the user equipment transmits the plurality of uplink control information to the base station. The base station receives the plurality of uplink control information associated with the designated index.

19 Claims, 10 Drawing Sheets

(56) References Cited

U.S. PATENT DOCUMENTS

| | | | | |
|---|---|---|---|---|
| 2017/0244533 A1* | 8/2017 | Onggosanusi | ....... | H04B 7/0478 |
| 2019/0260448 A1* | 8/2019 | Rahman | ............... | H04B 7/0632 |
| 2019/0379506 A1* | 12/2019 | Cheng | ................... | H04L 1/0038 |
| 2021/0368520 A1* | 11/2021 | Ryu | ..................... | H04W 88/10 |

OTHER PUBLICATIONS

International Searching Authority, "Written Opinion of the International Searching Authority," PCT/CN2019/073462, Sep. 23, 2019, pp. 1-3.

Samsung, Discussions on NR UL multi-panel/multi-TRP, 3GPP TSG RAN WG1 Meeting #90, R1-1713579, Aug. 21-25, 2017, pp. 1-3, Prague, Czechia.

Interdigital Inc., Aspects of Multi-TRP Transmission, 3GPP TSG RAN WG1 #95, R1-1813239, Nov. 12-16, 2018, pp. 1-3, Spokane, US.

* cited by examiner

FIG. 4 ent, a base station and a method thereof for transmitting uplink control information, and relates more particularly to user equipment, a base station and a method for transmitting uplink control information to multiple transmission reception points.

USER EQUIPMENT, BASE STATION AND METHOD FOR TRANSMITTING UPLINK CONTROL INFORMATION TO MULTIPLE TRANSMISSION RECEPTION POINTS

TECHNICAL FIELD

The present disclosure generally relates to user equipment, a base station and a method thereof for transmitting uplink control information, and relates more particularly to user equipment, a base station and a method for transmitting uplink control information to multiple transmission reception points.

BACKGROUND OF THE INVENTION

The fifth generation of cellular mobile communications, referred to as 5G, represents the next stage of cellular communications after the 4G (LTE/WiMax), 3G (UMTS) and 2G (GSM) systems. The 5G network architecture requires high data rate, reduced latency, energy efficiency, cost efficiency, greater system capacity, and widespread device connectivity. To satisfy these requirements, the network architecture of multiple transmission reception points (TRPs) is introduced.

With an ideal backhaul network for TRPs, the user equipment may correctly schedule the transmission of uplink control information corresponding to different TRPs. However, with a non-ideal TRP backhaul network, the user equipment may fail to correctly schedule the transmission of uplink control information corresponding to different TRPs.

BRIEF SUMMARY OF THE INVENTION

One embodiment of the present disclosure provides a user equipment. The user equipment includes a receiver and a transmitter. The receiver and the transmitter are electrically coupled. The receiver receives a configuration from a base station. The transmitter transmits a plurality of uplink control information (UCI) to the base station according to the configuration, wherein the configuration indicates that the plurality of UCIs are associated with a designated index.

Another embodiment of the present disclosure provides a base station. The base station includes a transmitter and a receiver. The receiver and the transmitter are electrically coupled. The transmitter transmits a configuration to a user equipment, wherein the configuration indicates the user equipment that a plurality of UCIs are associated with a designated index. The receiver receives the plurality of UCIs associated the designated index from the user equipment.

Yet another embodiment of the present disclosure provides a method of a user equipment. The method includes: receiving, by the user equipment, a configuration from a base station; and; and transmitting, by the user equipment, a plurality of UCIs to the base station according to the configuration, wherein the configuration indicates that the plurality of UCIs are associated with a designated index.

Yet another embodiment of the present disclosure provides a method of a base station. The method includes: transmitting, by the base station, a configuration to a user equipment, wherein the configuration indicates the user equipment that a plurality of UCIs are associated with a designated index; and receiving, by the base station, the plurality of UCIs associated the designated index from the user equipment.

DETAILED DESCRIPTION OF THE INVENTION

The detailed description of the appended drawings is intended as a description of the currently preferred embodiments of the present invention, and is not intended to represent the only form in which the present invention may be practiced. It should be understood that the same or equivalent functions may be accomplished by different embodiments that are intended to be encompassed within the spirit and scope of the present invention.

Figure 1A:
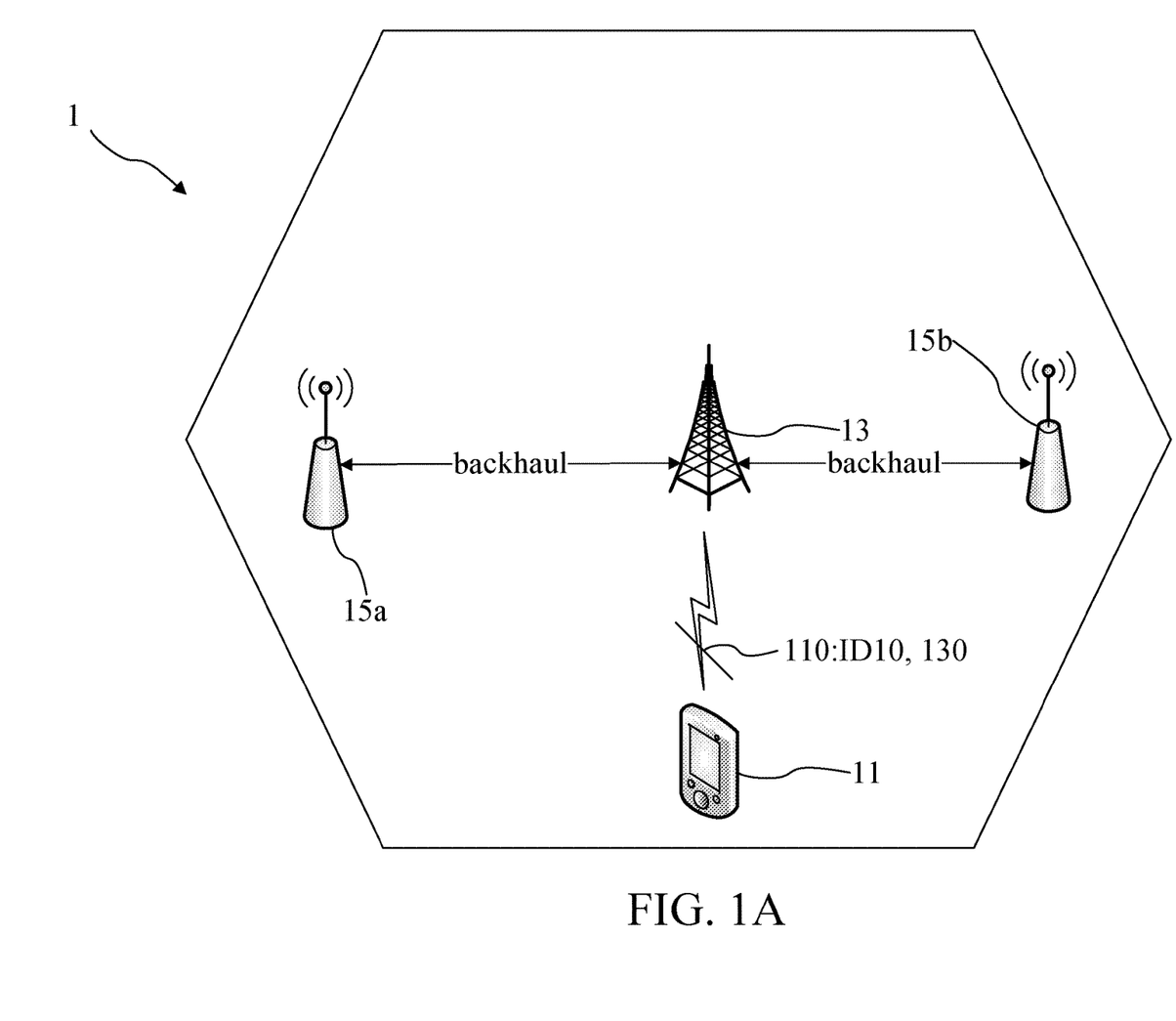
FIG. 1A is a schematic view of a network system according to an embodiment of the present disclosure.
Figure 1B:
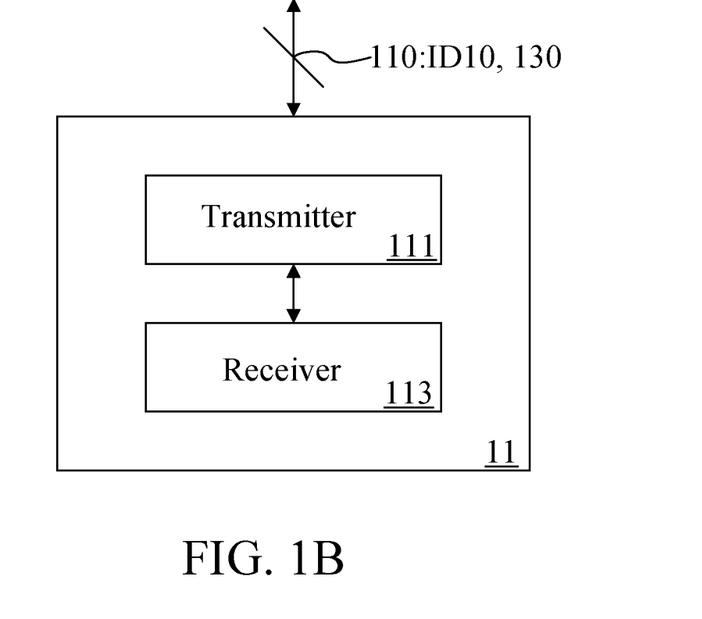
FIG. 1B is a block diagram of the user equipment according to an embodiment of the present disclosure.
Figure 1C:
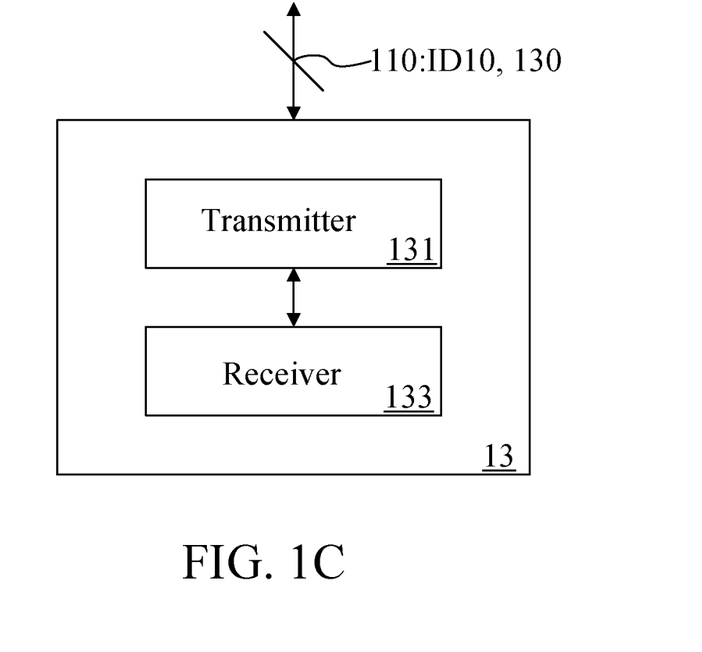
FIG. 1C is a block diagram of the base station according to an embodiment of the present disclosure.

Please refer to FIG. 1A to FIG. 1C. FIG. 1A is a schematic view of a network system 1 according to an embodiment of the present disclosure. The network system 1 includes a user equipment 11, a base station 13 and a plurality of transmission reception points (TRPs) 15a and 15b. FIG. 1B is a block diagram of the user equipment 11 according to the embodiment of the present disclosure. The user equipment 11 includes a transmitter 111 and a receiver 113. The transmitter 111 and the receiver 113 are electrically coupled (e.g., electrically connected via bus). FIG. 1C is a block diagram of the base station 13 according to the embodiment of the present disclosure. The base station 13 includes a transmitter 131 and a receiver 133. The transmitter 131 and the receiver 133 are electrically coupled (e.g., electrically connected via bus). In some embodiments, the base station 13 and the TRPs 15a and 15b may be included in a non-ideal backhaul network and the base station 13 may be a main server for operating the TRPs 15a and 15b. The interactions between the individual elements are described in further detail below.

For establishing connections between the user equipment 11 and the TRPs 15a and 15b, a mechanism may be introduced to allow the user equipment 11 to distinguish between the TRPs 15a and 15b during the transmissions of control information. In particular, the transmitter 131 of the base station 13 transmits a configuration 130 to the user equipment 11. The configuration 130 is used to indicate the user equipment 11 that a plurality of uplink control informations (UCIs) 110 are associated with a designated index ID10. In particular, the configuration 130 is used to indicate the user equipment 11 that the plurality of UCIs 110 which correspond to one of the TRPs 15a and 15b (e.g., TRP 15a in this embodiment) are associated with the same designated index ID10.

Accordingly, after the receiver 113 of the user equipment 11 receives the configuration 130, the user equipment 11 may be indicated that the plurality of UCIs 110 which correspond to the TRP 15a are associated with the same designated index ID10. Therefore, when the plurality of UCIs 110, which correspond to the TRP 15a and are associated with the same designated index ID10, are ready to be transmitted, the transmitter 111 of the user equipment 11 transmits the plurality of UCIs 110 to the base station 13 according to the configuration 130. In addition, the receiver 13 of the base station 133 receives the plurality of UCIs 110 associated with the same designated index ID10 from the user equipment 11 for obtaining the plurality of UCIs 110 corresponding to the TRP 15a.

Figure 2A:
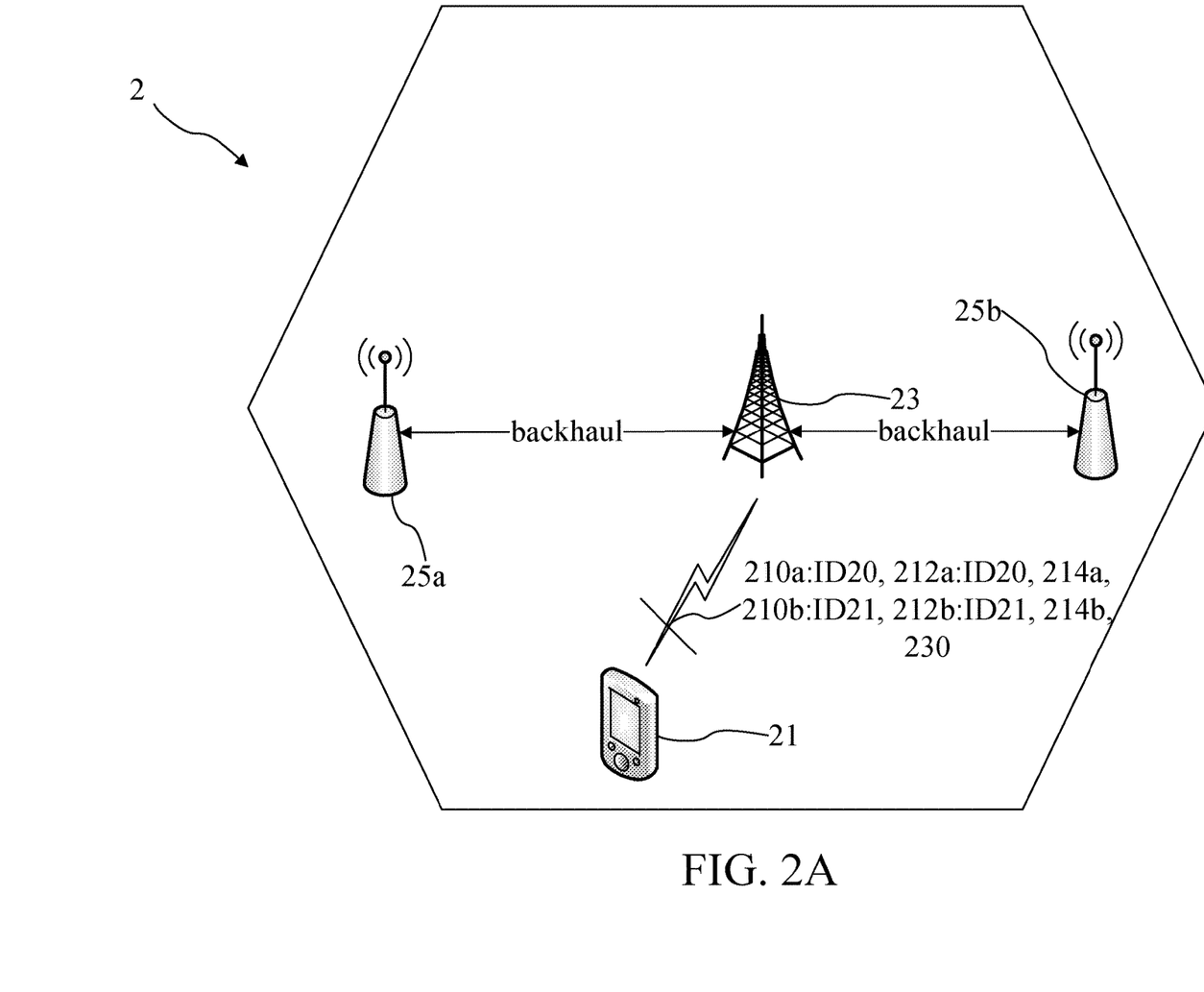
FIG. 2A is a schematic view of a network system according to an embodiment of the present disclosure.
Figure 2B:
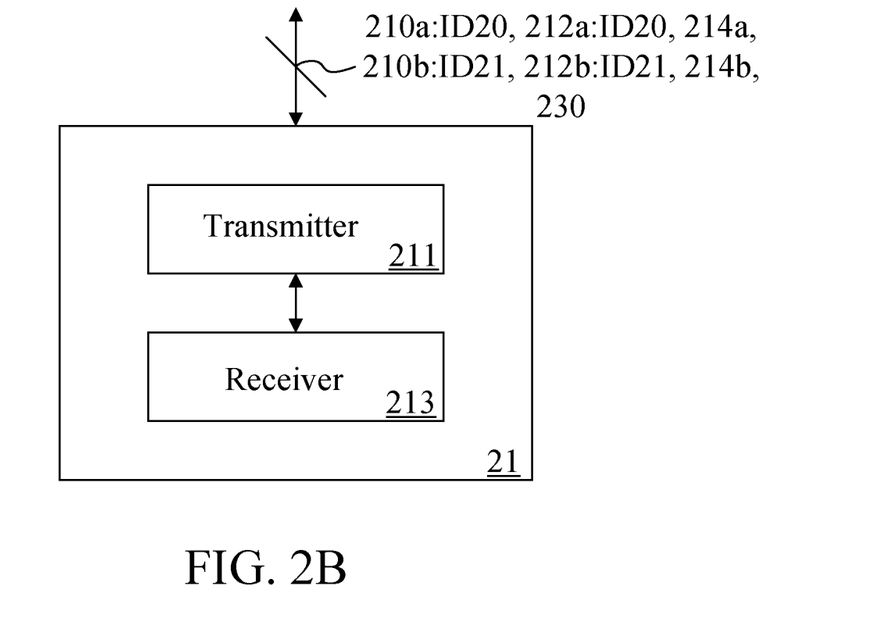
FIG. 2B is a block diagram of the user equipment according to an embodiment of the present disclosure.
Figure 2C:
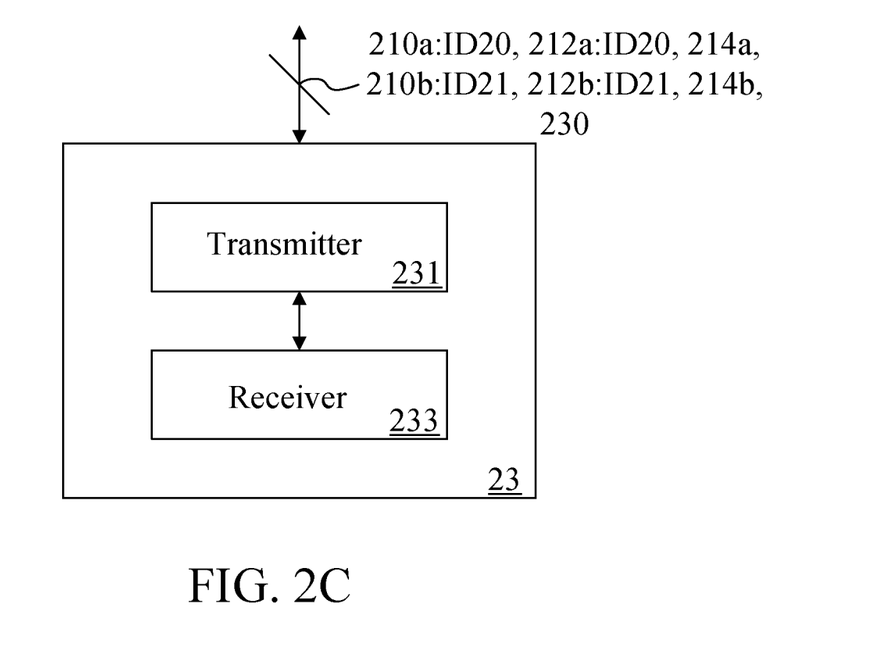
FIG. 2C is a block diagram of the base station according to an embodiment of the present disclosure.

Please refer to FIG. 2A to FIG. 2C. FIG. 2A is a schematic view of a network system 2 according to an embodiment of the present disclosure. The network system 2 includes a user equipment 21, a base station 23 and a plurality of TRPs 25a and 25b. FIG. 2B is a block diagram of the user equipment 21 according to the embodiment of the present disclosure. The user equipment 21 includes a transmitter 211 and a receiver 213. The transmitter 211 and the receiver 213 are electrically coupled (e.g., electrically connected via bus). FIG. 2C is a block diagram of the base station 23 according to the embodiment of the present disclosure. The base station 23 includes a transmitter 231 and a receiver 233. The transmitter 231 and the receiver 233 are electrically coupled (e.g., electrically connected via bus). In some embodiments, the base station 23 and the TRPs 25a and 25b may be included in a non-ideal backhaul network and the base station 23 may be a main server for operating the TRPs 25a and 25b. The interactions between the individual elements are described in further detail below.

In some embodiments, UCIs transmitted from a user equipment may include: a channel state information (CSI) report to report the channel state for a TRP, an acknowledge (ACK)/negative acknowledge (NACK) corresponding to a physical downlink shared channel (PDSCH) for a TRP, wherein the PDSCH corresponds to a physical downlink control channel (PDCCH) which is transmitted in a control resource set which is a time-frequency resource configured for PDCCH transmission, or a combination of CSI report and ACK/NACK.

Accordingly, the transmitter 231 of the base station 23 transmits a configuration 230 to the user equipment 21, and the configuration 230 is used to indicate that (1) each CSI report of a plurality of CSI repots 210a and 210b, which are used for the user equipment 21 to report different channel states for TRPs 25a and 25b, is associated with one index of a plurality of indexes ID20 and ID21, and (2) each control resource set of a plurality of control resource sets 212a and 212b, which include different physical resources and parameters for the user equipment 21 to communicate with different TRPs 25a and 25b, is associated with one index of the plurality of indexes ID20 and ID21.

In detail, in these embodiments, there are two TRPs 25a and 25b in the network system 2. Therefore, there may be two configured CSI reports 210a and 210b for the user equipment 21 to respectively report different channel states for the TRPs 25a and 25b, and there may be two configured control resource sets 212a and 212b for the user equipment 11 to respectively communicate with the TRPs 25a and 25b. Further, there may be two indexes ID20 and ID21 for the TRPs 25a and 25b. Accordingly, for the user equipment 21 to distinguish different messages for the TRPs 25a and 25b, the CSI report 210a and the control resource set 212a corresponding to the TRP 25a are associated with the index ID20, and the CSI report 210b and the control resource set 212b corresponding to the TRP 25b are associated with the index ID21.

After the receiver 211 of the user equipment 21 receives the configuration 210, the user equipment 21 may be indicated that: (1) the CSI report 210a and 210b, which are used for respectively reporting channel states for the TRPs 25a and 25b, are respectively associated with indexes ID20 and ID21; and (2) the control resource sets 212a and 212b, which are used for respectively communicating with the TRPs 25a and 25b, are respectively associated with indexes ID20 and ID21.

Therefore, in some embodiments, when the CSI report 210a, an ACK/NACK 214a corresponding to the control resource set 212a, or the combination of the CSI report 210a and the ACK/NACK 214a corresponding to the control resource set 212a, which are associated with the index ID20, are ready to be transmitted, the transmitter 211 of the user equipment 21 transmits the CSI report 210a, the ACK/NACK 214a corresponding to the control resource set 212a, or the combination of the CSI report 210a and the ACK/NACK 214a corresponding to the control resource set 212a, which are associated with the index ID20, to the base station 23 according to the configuration 230. In addition, the receiver 23 of the base station 233 receives the CSI report 210a, the ACK/NACK 214a corresponding to the control resource set 212a, or the combination of the CSI report 210a and the ACK/NACK 214a corresponding to the control resource set 212a, which are associated with the index ID20, from the user equipment 21 for obtaining UCIs corresponding to the TRP 25a.

In some embodiments, when the CSI report 210b, the ACK/NACK 214b corresponding to the control resource set 212b, or the combination of the CSI report 210b and the ACK/NACK 214b corresponding to the control resource set 212b, which are associated with the index ID21, are ready to be transmitted, the transmitter 211 of the user equipment 21 transmits the CSI report 210b, the ACK/NACK 214b corresponding to the control resource set 212b, or the combination of the CSI report 210b and the ACK/NACK 214b corresponding to the control resource set 212b, which are associated with the index ID21, to the base station 23 according to the configuration 230. In addition, the receiver 23 of the base station 233 receives the CSI report 210b, the ACK/NACK 214b corresponding to the control resource set 212b, or the combination of the CSI report 210b and the ACK/NACK 214b corresponding to the control resource set 212b, which are associated with the index ID21, from the user equipment 21 for obtaining UCIs corresponding to the TRP 25b.

It should be noted that, in some embodiments, the association between the CSI report (e.g., the CSI report 210a or 210b) and the index (e.g., the index ID20 or ID21) is achieved by designating the CSI report to the index directly. In some embodiments, the association between the CSI report (e.g., the CSI report 210a or 210b) and the index (e.g., the index ID20 or ID21) is achieved by designating a plurality of CSI reference signal (CSI-RS) resources (not shown) or a plurality of synchronization signal block (SSB) resources (not shown) configured for the CSI report to the index. In some embodiments, the association between the ACK/NACK corresponding to the control resource set (e.g., the ACK/NACK 212a or 212b corresponding to the control resource set 212a or 212b) and the index (e.g., the index ID20 or ID21) is achieved by designating the control resource set, which is used for a PDCCH transmission corresponding to the PDSCH of ACK/NACK, to the index.

In some embodiments, the indexes ID20 and ID21 may be defined as TRP identifications for the TRPs 25a and 25b, respectively. In particular, the index ID20 may be used as an identification of the TRP 25a, and the index ID21 may be used as an identification of the TRP 25b. Therefore, the user equipment 21 may distinguish the UCIs for different TRPs by different indexes since the UCIs are associated with different indexes of different TRPs.

In some embodiments, the indexes used as identifications for different TRPs may be PDCCH demodulation reference signal (DMRS) scrambling identifications defined in the control resource sets. For example, the index ID20 used as the identification of the TRPs 25a may be a PDCCH DMRS scrambling identification defined in the control resource set 212a. In other words, the PDCCH DMRS scrambling identification defined in the control resource set 212a may be used as the identification for the TRP 25a. Therefore, the association between the TRP 25a and the ACK/NACK 214a may be achieved since the ACK/NACK 214a corresponds to the control resource set 212a, and the control resource set 212a includes the PDCCH DMRS scrambling identification used as the identification for the TRP 25a. Accordingly, the user equipment 21 may identify that the ACK/NACK 214a corresponding to the control resource set 212a should be transmitted to the TRP 25a.

Further, the CSI report 210a is associated with the PDCCH DMRS scrambling identification defined in the control resource set 212a. Therefore, the association between the TRP 25a and the CSI report 210a may be achieved since the CSI report 210a is associated with the PDCCH DMRS scrambling identification used as the identification for the TRP 25a. Accordingly, the user equipment 21 may identify that the CSI report 210a should be transmitted to the TRP 25a.

In some embodiments, the indexes used as identifications for different TRPs may be CSI-RS scrambling identifications of the CSI-RS resources. For example, the index ID20 used as the identification of the TRPs 25a may be a CSI-RS scrambling identification of a CSI-RS resource corresponding to the CSI report 210a. In other words, the CSI-RS scrambling identification of the CSI-RS resource corresponding to CSI report 210a may be used as the identification for the TRP 25a. Therefore, the association between the TRP 25a and the CSI report 210a may be achieved since the CSI report 210a corresponds to the CSI-RS resource, and the CSI-RS scrambling identification of the CSI-RS resource is used as the identification for the TRP 25a. Accordingly, the user equipment 21 may identify that the CSI report 210a corresponding to the CSI-RS resource having the CSI-RS scrambling identification should be transmitted to the TRP 25a.

Further, the control resource set 212a is associated with the CSI-RS scrambling identification of the CSI-RS resource. Therefore, the association between the TRP 25a and the ACK/NACK 214a corresponding to the control resource set 212a may be achieved since the control resource set 212a is associated with the CSI-RS scrambling identification used as the identification for the TRP 25a. Accordingly, the user equipment 21 may identify that the ACK/NACK 214a should be transmitted to the TRP 25a.

In some embodiments, the indexes may be general numbers defined for the TRPs respectively. In some embodiments, the indexes may be downlink reference signal (DL RS) group identifications defined for TRPs. In detail, one DL RS group may be composed of reference signal resources (e.g., CSI-RS resource, SSB resource or the combination of CSI-RS resource and SSB resource). Further, each reference signal resource may only be included in one DL RS group which means that each reference signal resource may only be associated with one DL RS group. Accordingly, when a DL RS group identification of a DL RS group is used as an identification for the TRP 25a, the reference signal resource associated with the DL RS group may only be associated with the TRP 25a. Therefore, the association between the TRP 25a and the CSI report 210a corresponding to the reference signal resource may be achieved since: (1) the reference signal resource corresponds to the CSI report 210a; and (2) the reference signal resource is included in the DL RS group which has the DL RS group identification used as the identification for the TRP 25a.

In addition, when the DL RS group identification of the DL RS group is used as the identification for the TRP 25a, the control resource set 212a is associated with the DL RS group identification under low carrier frequency situation. In detail, under low carrier frequency situation, there may be no transmission configuration indication (TCI) state, which includes the reference signal resources, configured for the control resource set 212a. Therefore, the control resource set 212a is directly associated with the DL RS group identification for the association between the TRP 25a and the ACK/NACK 214a. In particular, the association between the TRP 25a and the ACK/NACK 214a may be achieved since the ACK/NACK 214a corresponds to the control resource set 212a, and the control resource set 212a corresponds to the DL RS group identification used as the identification for the TRP 25a.

On the other hand, there may be TCI state, which includes the reference signal resources, configured for the control resource set 212a under high carrier frequency situation, then the reference signal resources contained in the TCI state may be associated with the DL RS group identification for the association between the TRP 25a and the ACK/NACK 214a corresponding to the control resource set 212a.

Figure 2D:
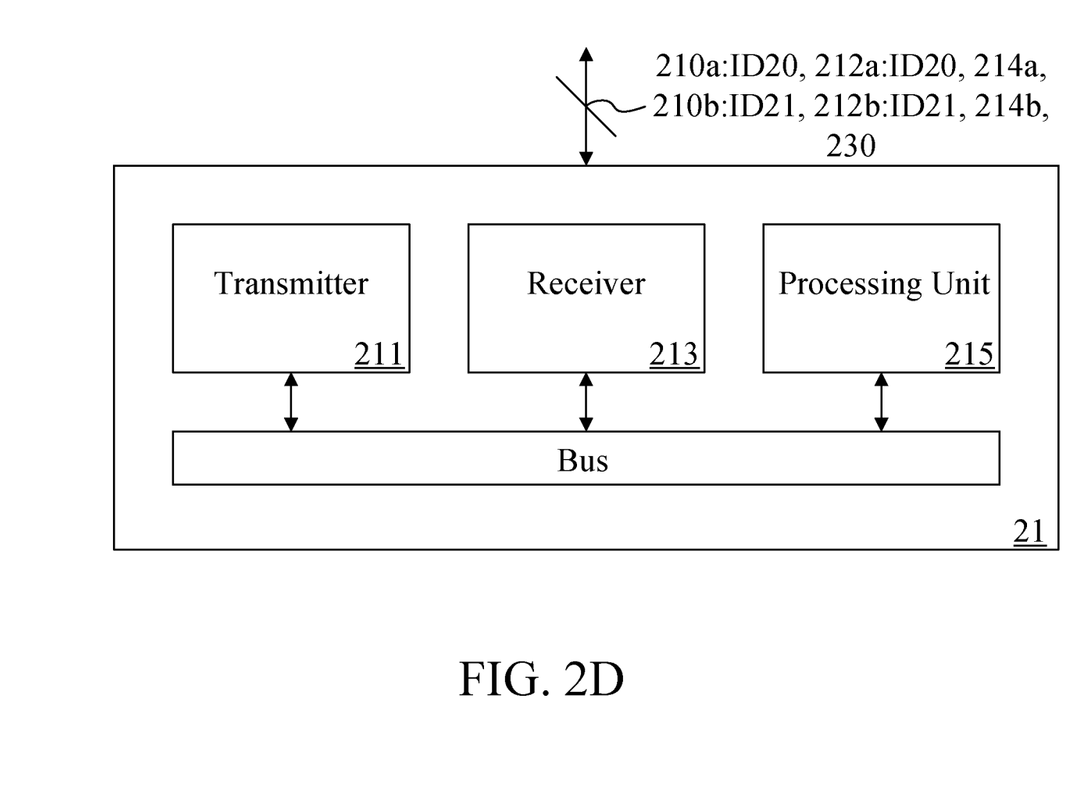
FIG. 2D is a block diagram of the user equipment according to an embodiment of the present disclosure.

Please refer to FIG. 2D, which is a block diagram of the user equipment 21 according to another embodiment of the present disclosure. The user equipment 21 further includes a processing unit 215. The processing unit 215, the transmitter 211 and the receiver 213 are electrically coupled (e.g., electrically connected via bus). The interactions between the individual elements are described in further detail below.

In some embodiments, before transmitting the UCIs corresponding to the same index (e.g., the CSI report 210a and the ACK/NACK 214a corresponding to index ID20, or the CSI report 210b and the ACK/NACK 214b corresponding to index ID21), the UCIs corresponding to the same index may be multiplexed first. Accordingly, before transmitting the UCIs corresponding to the same index, the processing unit 215 multiplexes the plurality of UCIs to a physical downlink control channel (PUCCH) resource.

Figure 2E:
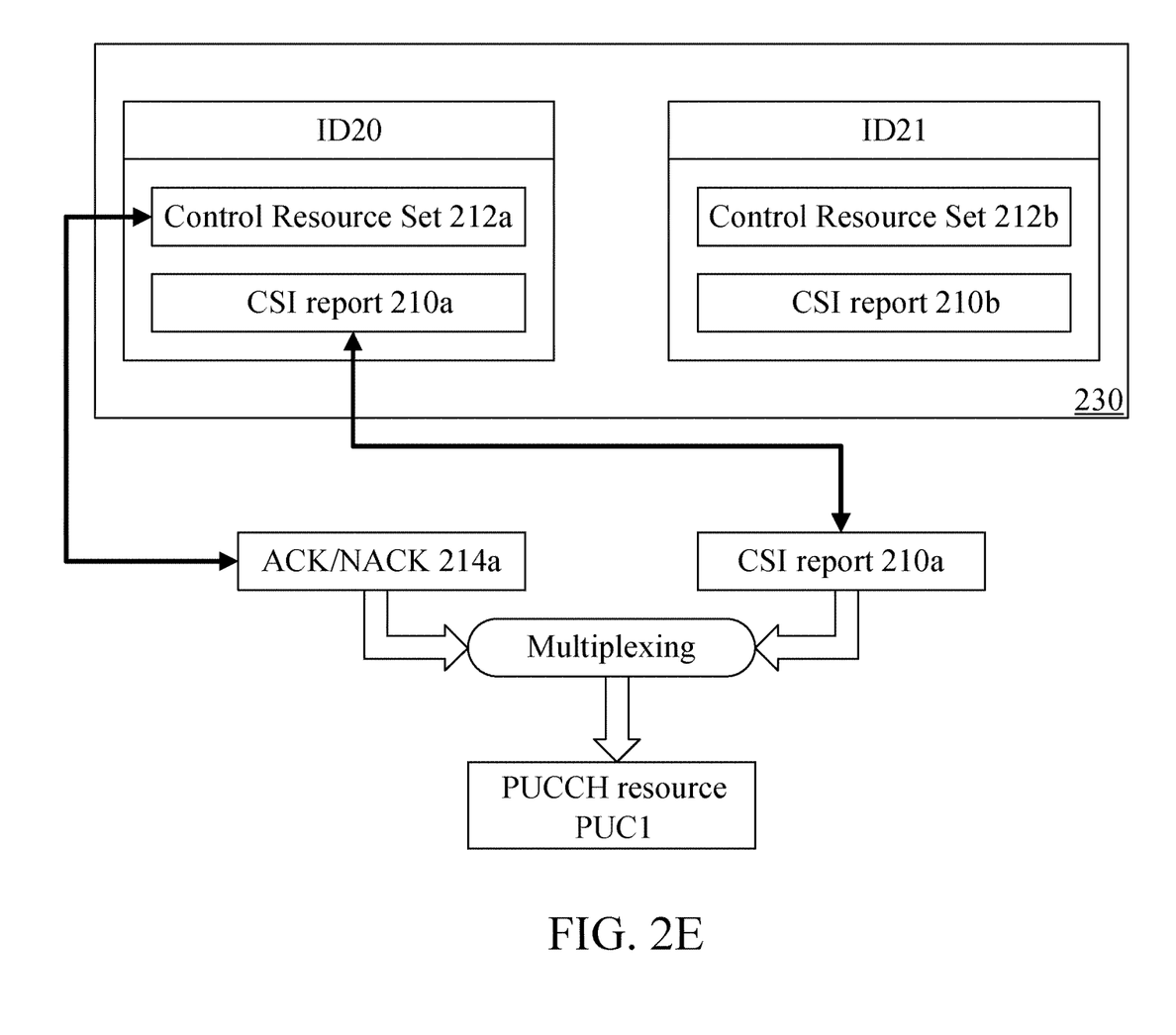
FIG. 2E is a schematic view of multiplexing UCIs to a PUCCH resource associated with designated index according to an embodiment of the present disclosure.

Please refer to FIG. 2E, which is a schematic view of multiplexing UCIs to a PUCCH resource PUC1 associated with the index ID20 according to an embodiment of the present disclosure. In this embodiment, the UCIs selected to be transmitted include the CSI report 210a and the ACK/NACK 214a, because the CSI report 210a is designated to the index ID20 based on the configuration 230, and because the control resource set 212a which corresponds to the ACK/NACK 214a is designated to the index ID20 based on the configuration 230. In other words, the CSI report 210a and the ACK/NACK 214a are ready to be transmitted together because the CSI report 210a and the ACK/NACK 214a are associated with the same index ID20 used for the TRP 25a.

Next, before transmitting the CSI report 210a and the ACK/NACK 214a which correspond to the same index ID20 based on the configuration 230, the user equipment 21 multiplexes the CSI report 210a and the ACK/NACK 214a to a PUCCH resource PUC1. In particular, the PUCCH resource PUC1 may be indicated by a PUCCH resource indicator (not shown) of the control resource set 212a which is associated with the index ID20. In other words, the PUCCH resource PUC1 used for carrying the CSI report 210a and the ACK/NACK 214a is associated with the index ID20. Next, after the processing unit 215 of the user equipment 21 multiplexes the CSI report 210a and the ACK/NACK 214a in the PUCCH resource PUC1, the transmitter 211 of the user equipment 21 transmits the PUCCH resource PUC1 with the CSI report 210a and the ACK/NACK 214a to the base station 23. In some embodiments, the PUCCH resource PUC1 may be determined by the PUCCH resource indicator of the control resource set 212a and the payload size of the CSI report 210a and the ACK/NACK 214a.

Figure 2F:
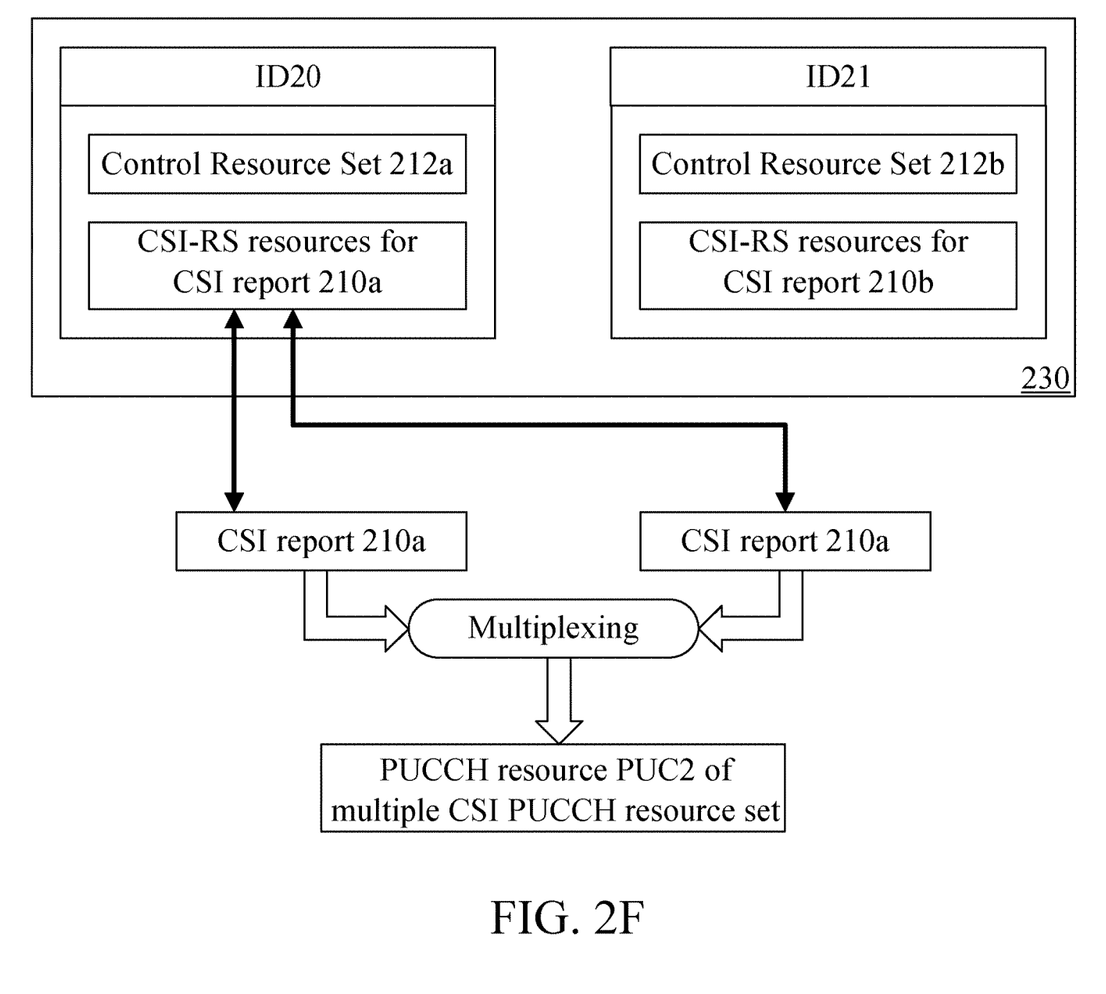
FIG. 2F is a schematic view of multiplexing UCIs to a PUCCH resource associated with designated index according to an embodiment of the present disclosure.

Please refer to FIG. 2F, which is a schematic view of multiplexing UCIs to a PUCCH PUC2 associated with the index ID20 according to some embodiments of the present disclosure. In this embodiment, the UCIs selected to be transmitted include a plurality of CSI reports 210a, and the CSI-RS resources used for the CSI report 210a are designated to the index ID20 based on the configuration 230. In other words, the plurality of CSI reports 210a are ready to be transmitted together because the CSI-RS resources used for the CSI report 210a are associated with the same index ID20 used for the TRP 25a.

In particular, the PUCCH resource PUC2 selected from a multiple CSI PUCCH resource set, which is configured for carrying CSI report, is designated to the index ID20. Accordingly, when the plurality of CSI reports 210a are ready to be transmitted, the processing unit 215 multiplexes the plurality of CSI reports 210a in the PUCCH resource PCH2, and the transmitter 211 of the user equipment 21 transmits the PUCCH resource PUC2 with the plurality of CSI reports 210a to the base station 23.

In some embodiments, another PUCCH resource (not shown) may be selected based on a spatial relation information of another PUCCH resource. In detail, the spatial relation information of another PUCCH resource is configured between a reference signal resource (e.g., a CSI-RS resource or an SSB resource) of the CSI report 210a and another PUCCH resource. Accordingly, when the reference signal of the CSI report 210a is designated to the same index ID20, another PUCCH resource, which is configured with the reference signal by the spatial relation information, is selected for carrying the plurality of CSI reports 210a associated with the same index ID20.

Figure 2G:
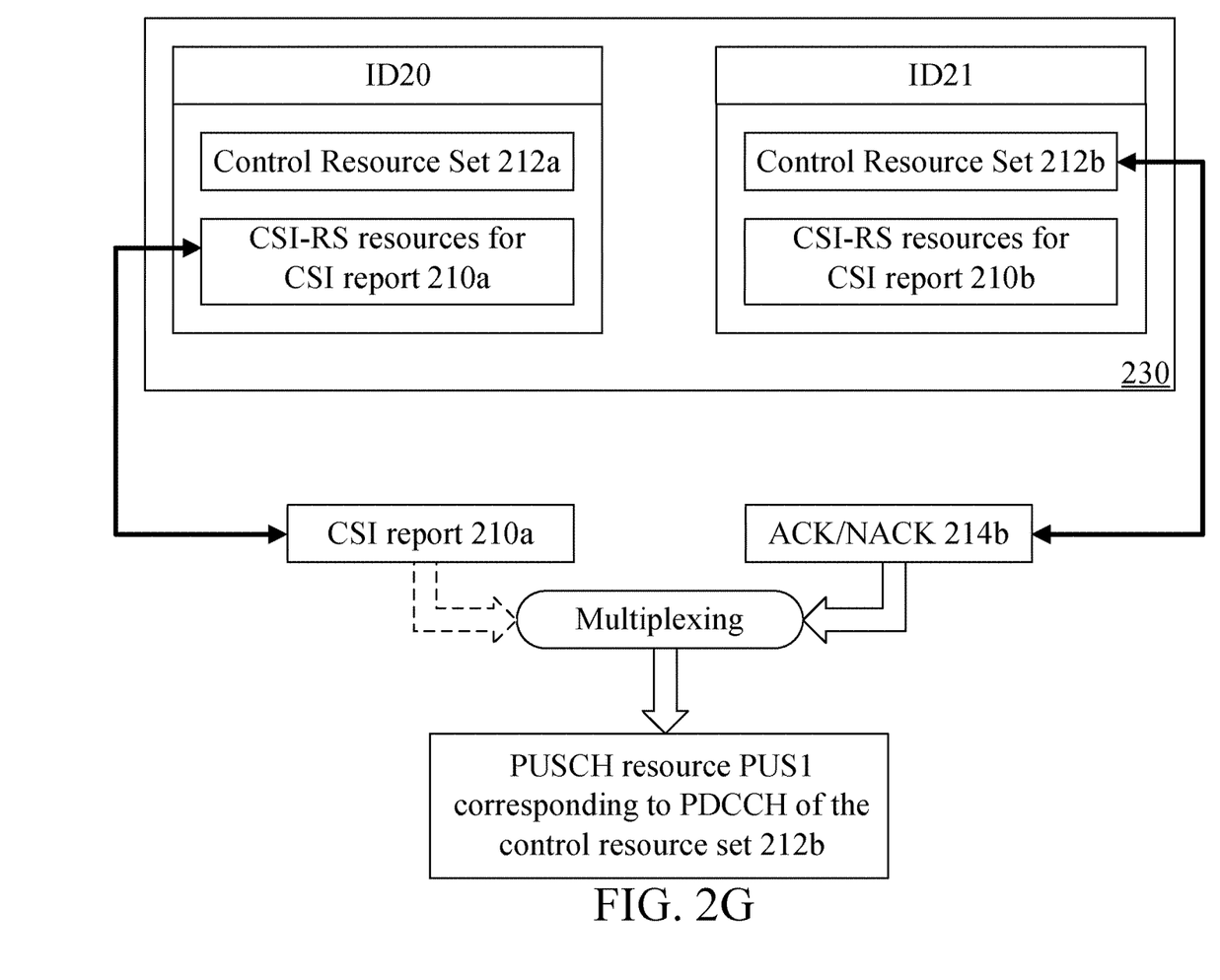
FIG. 2G is a schematic view of multiplexing UCIs to a PUSCH resource associated with designated index according to an embodiment of the present disclosure.

Please refer to FIG. 2G, which is a schematic view of multiplexing UCIs to a PUSCH resource PUS1 associated with the index ID21 according to some embodiments of the present disclosure. In this embodiment, the UCI selected for being transmitted includes the ACK/NACK 214b. The ACK/NACK 214b corresponds to the control resource set 212b, which is designated to the index ID21, based on the configuration 230. In other words, the ACK/NACK 214b, which is associated with the index ID21 for the TRP 25b, is ready to be transmitted.

In particular, the PUSCH resource PUS1 corresponding to the PDCCH of the control resource set 212b is selected for carrying the ACK/NACK 214b. In this embodiment, in the same time duration, the CSI report 210a is ready to be transmitted. However, the CSI report 210a may not be multiplexed (as indicated by the dotted line) in the PUSCH resource PUS1, since the CSI report 210a, which is associated with the index ID20, is not associated with the same index ID21. Accordingly, the processing unit 215 multiplexes the ACK/NACK 214b in the PUSCH resource PUS1, and the transmitter 211 of the user equipment 21 transmits the PUSCH resource PUS1 with the ACK/NACK 214b to the base station 23.

In some embodiments, another PUSCH resource (not shown) may be selected based on a spatial relation information of another PUSCH resource. In detail, the spatial relation information of another PUSCH resource is configured between a reference signal resource (e.g., a CSI-RS resource, an SSB resource, or a sounding reference signal (SRS) resource) of the CSI report 210b and another PUSCH resource. Accordingly, when the reference signal of the CSI report 210b is designated to the same index ID21, another PUSCCH resource, which is configured with the reference signal by the spatial relation information, is selected for carrying UCIs (i.e., the ACK/NACK 214b) associated with the same index ID21.

It shall be particularly appreciated that the processing unit mentioned in the above embodiments may be a central processing unit (CPU), other hardware circuit elements capable of executing relevant instructions, or a combination of computing circuits that are well-known by those skilled in the art based on the above disclosures. Moreover, the transmitters and the receivers mentioned in the above embodiments may be a network data transmitter and a network data receiver. However, such description is not intended to limit the hardware implementation embodiments of the present disclosure.

Figure 3:
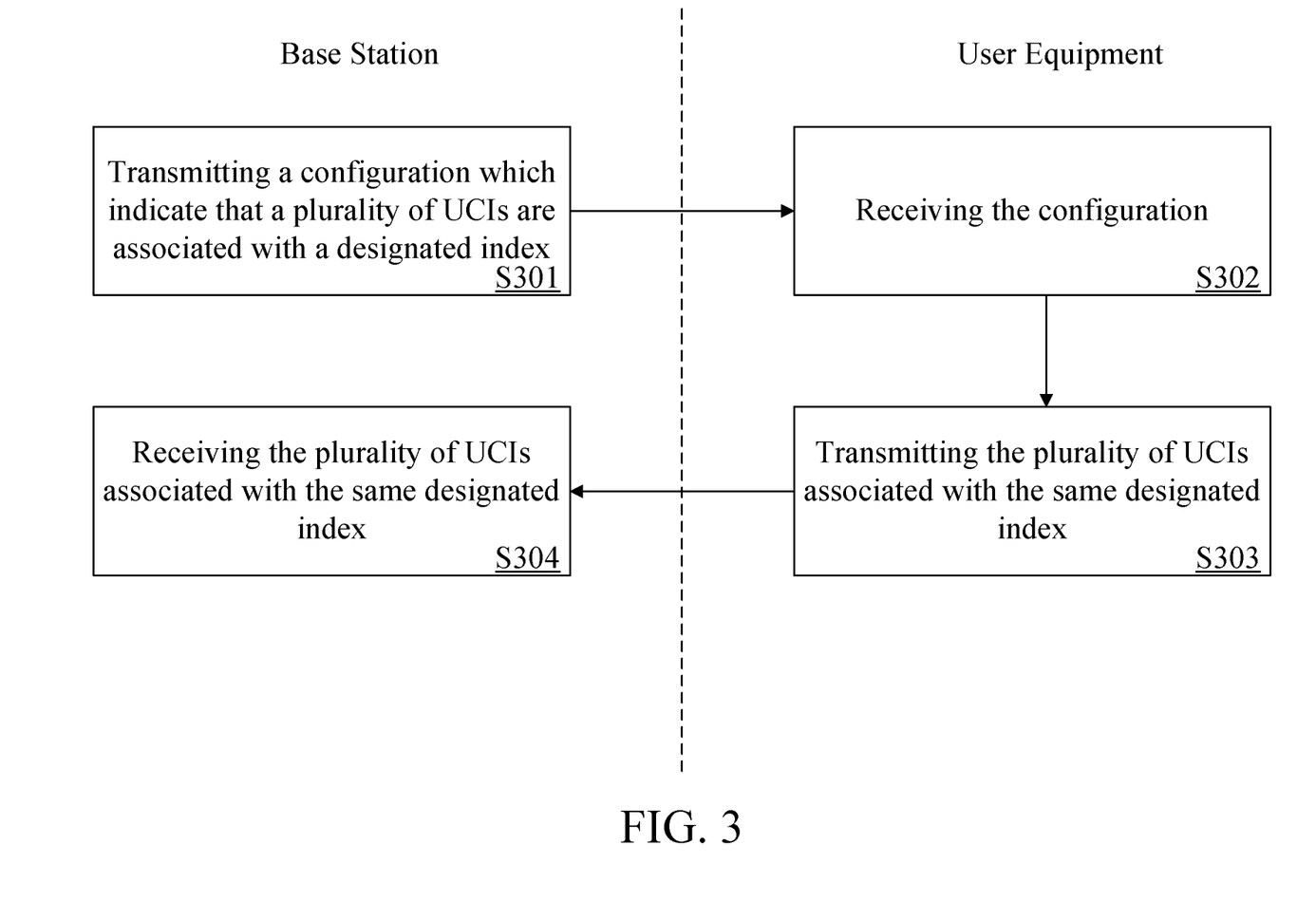
FIG. 3 is a flowchart diagram according to an embodiment of the present disclosure.

Some embodiments of the present disclosure include a method, and a flowchart diagram thereof is shown in FIG. 3. The method of some embodiments is for use in a network system (e.g., the network system of the aforesaid embodiments), wherein the network system includes a user equipment and a base station (e.g., the user equipment and the base station of the aforesaid embodiments). The base station may be included in a non-ideal backhaul network and may be a main server for operating a plurality of TRPs. Detailed operations of the method are described below.

Please refer to FIG. 3. Operation S301 is executed to transmit, by the base station, a configuration to the user equipment. The configuration indicates the user equipment that a plurality of UCIs are associated with a designated index for one TRP of the TRPs. Operation S302 is executed to receive, by the user equipment, the configuration from the base station. When the plurality of UCIs associated with the same designated index are ready to be transmitted, operation S303 is executed to transmit, by the user equipment, the plurality of UCIs associated with the same designated index to the base station according to the configuration. Operation S304 is executed to receive, by the base station, the plurality of UCIs associated with the same designated index from the user equipment.

Figure 4:
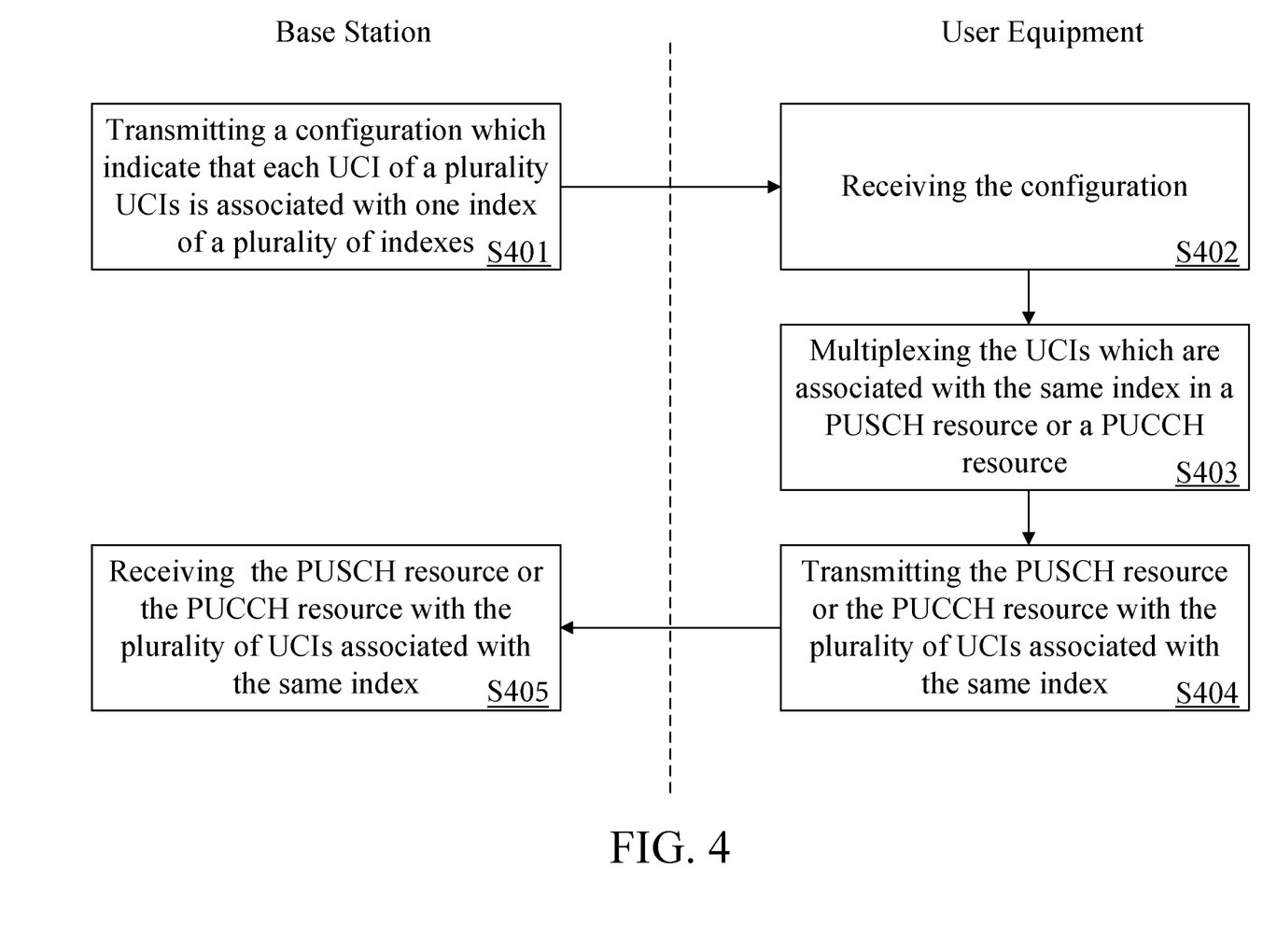
FIG. 4 is a flowchart diagram according to an embodiment of the present disclosure.

Some embodiments of the present disclosure include a method, and a flowchart diagram thereof is shown in FIG. 4. The method of some embodiments is for use in a network system (e.g., the network system of the aforesaid embodiments), and the network system includes a user equipment and a base station (e.g., the user equipment and the base station of the aforesaid embodiments). The base station may be included in a non-ideal backhaul network and may be a main server for operating a plurality of TRPs. Detailed operations of the method are described below.

Please refer to FIG. 4. Operation S401 is executed to transmit, by the base station, a configuration to the user equipment. The configuration indicates the user equipment that each UCI of a plurality of UCIs is associated with one index of a plurality of indexes. Operation S402 is executed to receive, by the user equipment, the configuration from the base station.

Accordingly, when the UCIs which are associated with the same index are ready to be transmitted, operation S403 is executed to multiplex, by the user equipment, the UCIs associated with the same index, to a PUSCH resource or a PUCCH resource according to the configuration. Operation S404 is executed to transmit, by the user equipment, the PUSCH resource or the PUCCH resource with the UCIs associated with the same index to the base station. Operation S405 is executed to receive, by the base station, the PUSCH resource or the PUCCH resource with the UCIs associated with the same index from the user equipment.

In some embodiments, the UCIs associated with the same index may include a CSI report associated with the same index, an ACK/NACK corresponding to a control resource set associated with the same index or the combination of the CSI report and the ACK/NACK which are associated with the same index. In some embodiments, the UCIs associated with the same index are multiplexed to the PUSCH resource which corresponds to the ACK/NACK, while the PUSCH resource is scheduled by a PDCCH of the control resource set which is associated with the same index. In some embodiments, the UCIs associated with the same index are multiplexed to the PUSCH when a spatial relation information of the PUSCH resource corresponds to a CSI-RS resource or an SSB resource which is designated to the same index. In some embodiments, the UCIs associated with the same index are multiplexed to the PUCCH resource which is associated with the same index.

The method of the present disclosure can be implemented on a programmed processor. However, the controllers, flowcharts, and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device that has a finite state machine capable of implementing the flowcharts shown in the figures may be used to implement the processing functions of the present disclosure.

While the present disclosure has been described with specific embodiments thereof, it is evident that many alternatives, modifications, and variations will be apparent to those skilled in the art. For example, various components of the embodiments may be interchanged, added, or substituted in the other embodiments. Also, all of the elements shown in each figure are not necessary for operation of the disclosed embodiments. For example, one skilled in the art of the disclosed embodiments would be capable of making and using the teachings of the present disclosure by simply employing the elements of the independent claims. Accordingly, the embodiments of the present disclosure as set forth herein are intended to be illustrative, not limiting. Various changes may be made without departing from the spirit and scope of the present disclosure.

In this document, relational terms such as "first," "second," and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more. The terms "including," "having," and the like, as used herein, are defined as "comprising."

We claim:

1. A user equipment (UE), comprising:
   at least one memory; and
   at least one processor coupled with the at least one memory and configured to cause the UE to:
      receive a configuration from a base station; and
      transmit a plurality of uplink control information (UCI) to the base station according to the configuration, the plurality of UCI comprising a plurality of channel state information (CSI) reports, each CSI report of the plurality of CSI reports being associated with a control resource set (CORESET),
   wherein the configuration includes:
      an association between each CSI report of the plurality of CSI reports and a designated index of a plurality of designated indices; and
      an association between the designated index and each CORESET corresponding to each CSI report of the plurality of CSI reports.

2. The UE of claim 1, wherein the configuration includes that each UCI of the plurality of UCI is associated with a designated index of the plurality of designated indices.

3. The UE of claim 1, wherein synchronization signal block (SSB) resources configured for each CSI report of the plurality of CSI reports as associated with the designated index of the plurality of designated indices.

4. The UE of claim 1, wherein the plurality of UCI comprises an acknowledge/negative-acknowledge corresponding to a physical downlink shared channel (PDSCH), and the configuration designates a control resource set (CORESET), which is used for a physical downlink control channel (PDCCH) transmission corresponding to the PDSCH, as associated with the designated index.

5. The UE of claim 1, wherein the at least one processor is configured to cause the UE to:
   multiplex the plurality of UCI to a physical uplink shared channel (PUSCH) resource, wherein a spatial relation information of the PUSCH resource corresponds to a channel state information reference signal (CSI-RS) resource or a synchronization signal block (SSB) resource associated with the designated index; and
   transmit the PUSCH resource with the plurality of UCI to the base station according to the configuration.

6. The UE of claim 1, wherein the at least one processor is configured to cause the UE to:
   multiplex the plurality of UCI to a physical uplink shared channel (PUSCH) resource with a CORESET, where a physical downlink control channel (PDCCH) scheduling the PDSCH resource is transmitted, associated with the designated index; and
   transmit the PUSCH resource with the plurality of UCI to the base station according to the configuration.

7. The UE of claim 1, wherein the designated index comprises a downlink reference signal group identification.

8. The UE of claim 1, wherein the at least one processor is configured to cause the UE to:
multiplex the plurality of UCI to a physical uplink control channel (PUCCH) resource associated with the designated index; and
transmit the PUCCH resource with the plurality of UCI to the base station according to the configuration.

9. The UE of claim 8, wherein the PUCCH resource of a multiple channel state information (CSI) PUCCH resource set, which is configured for multiplexing a plurality of CSI of the plurality of UCI, is associated with the designated index.

10. The UE of claim 8, wherein a spatial relation information of the PUCCH resource corresponds to a CSI reference signal (RS) resource or a synchronization signal block (SSB) resource that is associated with the designated index.

11. A method performed by a user equipment (UE), the method comprising:
receiving, by the UE, a configuration from a base station; and
transmitting, by the UE, a plurality of uplink control information (UCI) to the base station according to the configuration, the plurality of UCI comprising a plurality of channel state information (CSI) reports, each CSI report of the plurality of CSI reports being associated with a control resource set (CORESET),
wherein the configuration includes:
an association between each CSI report of the plurality of CSI reports and a designated index of a plurality of designated indices; and
an association between the designated index and each CORESET corresponding to each CSI report of the plurality of CSI reports.

12. The method of claim 11, further comprising:
multiplexing, by the UE, the plurality of UCI with the designated index to a physical uplink shared channel (PUSCH) resource, wherein a spatial relation information of the PUSCH resource corresponds to a channel state information reference signal (CSI-RS) resource or a synchronization signal block (SSB) resource associated with the designated index; and
wherein transmitting the plurality of UCI further comprises:
transmitting, by the UE, the PUSCH resource with the plurality of UCI to the base station according to the configuration.

13. The method of claim 11, further comprising:
multiplexing, by the UE, the plurality of UCI to a physical uplink shared channel (PUSCH) resource with a control resource set (CORESET, where a physical downlink control channel (PDCCH) scheduling the PDSCH resource is transmitted, associated with the designated index; and
wherein transmitting the plurality of UCI further comprises:
transmitting, by the UE, the PUSCH resource with the plurality of UCI to the base station according to the configuration.

14. The method of claim 11, further comprising:
multiplexing, by the UE, the plurality of UCI to a physical uplink control channel (PUCCH) resource associated with the designated index; and
wherein transmitting the plurality of UCI further comprises:
transmitting, by the UE, the PUCCH resource with the plurality of UCI to the base station according to the configuration.

15. A method performed by a base station, the method comprising:
transmitting, by the base station, a configuration to a user equipment (UE), wherein the configuration includes:
an association between each CSI report of a plurality of CSI reports and a designated index of a plurality of designated indices; and
an association between the designated index and a control resource set (CORESET) corresponding to each CSI report of the plurality of CSI reports; and
receiving, by the base station, a plurality of uplink control information (UCI) associated with the plurality of designated indices from the UE.

16. The method of claim 15, wherein receiving the plurality of UCI further comprises:
receiving, by the base station, a physical uplink shared channel (PUSCH) resource with the plurality of UCI from the UE, wherein a spatial relation information of the PUSCH resource corresponds to a channel state information reference signal (CSI-RS) resource or a synchronization signal block (SSB) resource associated with the designated index.

17. The method of claim 15, wherein receiving the plurality of UCI further comprises:
receiving, by the base station, a physical uplink shared channel (PUSCH) resource with the plurality of UCI from the UE, wherein the PUSCH resource is with a CORESET, where a physical downlink control channel (PDCCH) scheduling the PDSCH resource is transmitted, associated with a designated index of the plurality of designated indices.

18. The method of claim 15, wherein receiving the plurality of UCI further comprises:
receiving, by the base station, a physical uplink control channel (PUCCH) resource with the plurality of UCI from the UE, wherein the PUCCH resource is associated with a designated index of the plurality of designated indices.

19. A base station, comprising:
at least one memory; and
at least one processor coupled with the at least one memory and configured to cause the base station to:
transmit a configuration to a user equipment (UE), wherein the configuration includes:
an association between each CSI report of a plurality of CSI reports and a designated index of a plurality of designated indices; and
an association between the designated index and a control resource set (CORESET) corresponding to each CSI report of the plurality of CSI reports; and
receive a plurality of uplink control information (UCI) associated with the plurality of designated indices from the UE.

* * * * *